United States Patent
Townes et al.

(10) Patent No.: US 12,018,573 B2
(45) Date of Patent: Jun. 25, 2024

(54) TURBINE ARRANGEMENT INCLUDING A TURBINE OUTLET STATOR VANE ARRANGEMENT

(71) Applicant: ITP NEXT GENERATION TURBINES S.L., Vizcaya (ES)

(72) Inventors: Roderick M Townes, Derby (GB); Joseba Leorri López, Derby (GB)

(73) Assignee: ITP NEXT GENERATION TURBINES S.L., Zamudio (ES)

( * ) Notice: Subject to any disclaimer, the term of this patent is extended or adjusted under 35 U.S.C. 154(b) by 0 days.

(21) Appl. No.: 18/079,133

(22) Filed: Dec. 12, 2022

(65) Prior Publication Data
US 2023/0296032 A1 Sep. 21, 2023

(30) Foreign Application Priority Data

Dec. 24, 2021 (ES) .................................... 202131216
Feb. 8, 2022 (GB) .................................... 2201597.8

(51) Int. Cl.
*F01D 25/14* (2006.01)
*F01D 5/08* (2006.01)
(Continued)

(52) U.S. Cl.
CPC .............. *F01D 25/14* (2013.01); *F01D 9/041* (2013.01); *F01D 11/127* (2013.01);
(Continued)

(58) Field of Classification Search
CPC .......... F01D 11/08; F01D 5/225; F01D 25/08; F01D 25/12; F01D 25/14; F01D 11/24;
(Continued)

(56) References Cited

U.S. PATENT DOCUMENTS 1,493,266 A 5/1924 Junggren
3,975,901 A 8/1976 Hallinger et al.
(Continued)

FOREIGN PATENT DOCUMENTS

EP 1 052 375 A2 11/2000
EP 1 205 634 A2 5/2002
(Continued)

OTHER PUBLICATIONS

Apr. 25, 2023 Search Report issued in European Patent Application No. 22213343.
(Continued)

*Primary Examiner* — Eric J Zamora Alvarez
(74) *Attorney, Agent, or Firm* — Oliff PLC

(57) ABSTRACT

A turbine arrangement includes a turbine rotor arrangement, a turbine seal arrangement and a turbine outlet stator vane arrangement. Turbine rotor arrangement includes a rotor and a plurality of turbine blades that extend radially. Each turbine blade has a turbine shroud. Turbine seal arrangement is spaced radially around the turbine shrouds. Turbine outlet stator vane arrangement includes radially inner and outer annular members arranged coaxially and a plurality of vanes extending radially between the radially inner and outer annular members. The vanes are arranged downstream of the turbine blades. Liner is spaced radially inwardly from a radially inner surface of the annular member to define a chamber. Turbine shrouds and the upstream end of the liner are arranged such that in operation any leakage flow of gas between the turbine shrouds and the turbine seal arrangement flows into the chamber to manage the temperature of the radially outer annular member.

19 Claims, 10 Drawing Sheets

(51) Int. Cl.
- *F01D 5/20* (2006.01)
- *F01D 9/04* (2006.01)
- *F01D 9/06* (2006.01)
- *F01D 11/02* (2006.01)
- *F01D 11/10* (2006.01)
- *F01D 11/12* (2006.01)
- *F01D 25/08* (2006.01)
- *F01D 25/10* (2006.01)
- *F01D 25/24* (2006.01)
- *F01D 25/26* (2006.01)
- *F01D 25/30* (2006.01)

(52) U.S. Cl.
CPC ...... *F05D 2240/14* (2013.01); *F05D 2240/55* (2013.01); *F05D 2260/22141* (2013.01)

(58) Field of Classification Search
CPC ........ F01D 25/246; F01D 9/041; F01D 11/10; F01D 11/127; F01D 11/122; F01D 9/04; F01D 11/02; F01D 9/02; F01D 25/10; F01D 25/243; F01D 5/187; F01D 5/081; F01D 25/24; F01D 25/26; F01D 5/143; F01D 5/20; F01D 1/02; F01D 1/023; F01D 1/04; F01D 11/001; F01D 25/28; F01D 25/30; F01D 5/12; F01D 9/042; F01D 11/005; F01D 9/00; F01D 9/06; F01D 9/065; F05D 2240/11; F05D 2240/81; F05D 2260/20; F05D 2260/201; F05D 2260/221; F05D 2240/55; F05D 2220/32; F05D 2260/22141; F05D 2260/2214; F05D 2240/80; F05D 2240/12; F05D 2240/14; F05D 2250/283; Y02T 50/60
See application file for complete search history.

(56) References Cited

U.S. PATENT DOCUMENTS

| | | | |
|---|---|---|---|
| 4,752,185 A | 6/1988 | Butler et al. | |
| 4,925,365 A * | 5/1990 | Crozet | F01D 9/04 415/173.6 |
| 6,394,749 B2 * | 5/2002 | Yu | F01D 25/12 415/176 |
| 6,779,597 B2 * | 8/2004 | DeMarche | F01D 11/24 165/169 |
| 7,063,509 B2 * | 6/2006 | Snook | F01D 5/141 416/189 |
| 8,147,180 B2 * | 4/2012 | Tani | F01D 5/145 415/173.1 |
| 9,920,645 B2 * | 3/2018 | Mahle | F01D 5/225 |
| 2006/0280610 A1 * | 12/2006 | Heyward | C22C 14/00 416/189 |
| 2009/0110550 A1 | 4/2009 | Tani et al. | |
| 2010/0226768 A1 | 9/2010 | Senoo | |
| 2013/0230379 A1 * | 9/2013 | Ali | F01D 5/225 415/58.5 |
| 2014/0140833 A1 * | 5/2014 | Albers | F01D 25/28 415/208.1 |
| 2017/0130588 A1 * | 5/2017 | Townes | F01D 11/08 |
| 2022/0259983 A1 * | 8/2022 | Nishii | F01D 11/08 |

FOREIGN PATENT DOCUMENTS

| | | |
|---|---|---|
| EP | 2 116 692 A2 | 11/2009 |
| EP | 2 889 456 A1 | 7/2015 |
| EP | 3 012 409 A1 | 4/2016 |
| EP | 3 098 391 A2 | 11/2016 |
| EP | 3 358 142 A1 | 8/2018 |
| GB | 1 581 566 A | 12/1980 |
| JP | WO2013/027239 A1 | 3/2015 |

OTHER PUBLICATIONS

Aug. 4, 2022 Search Report issued in British Patent Application No. 2201597.8.

* cited by examiner

TURBINE ARRANGEMENT INCLUDING A TURBINE OUTLET STATOR VANE ARRANGEMENT

TECHNICAL FIELD

The present disclosure relates to a turbine arrangement including an outlet stator vane arrangement and in particular to a turbine arrangement including an outlet stator vane arrangement for a gas turbine engine.

BACKGROUND

A radially outer annular member of the outlet stator vane arrangement of the turbine arrangement of an aero gas turbine engine is commonly provided with radially outwardly extending lugs which are used to mount the gas turbine engine onto the aircraft structure for example an aircraft pylon. A radially inner annular member of the outlet stator vane arrangement of the turbine arrangement supports a bearing in which a turbine is rotatably mounted.

The radially outer annular member and the lugs form a relatively massive and stiff structure to withstand the mechanical loads coming from the mount to the aircraft structure and also to support the turbine via the bearing. The outlet stator vane arrangement is subjected to hot gases flowing out of the turbine and thus the radially outer annular member and the vanes of the outlet stator vane arrangement are subjected to the hot gases. The radially outer annular member and the lugs heat up relatively slowly due to their relatively high mass whereas the vanes heat up relatively quickly due to their relatively low mass, for example when the gas turbine engine is started from ambient temperature and operated at up to maximum power conditions, e.g. take off. This difference in thermal expansion between the radially outer annular member and the lugs and the vanes results in relatively high stresses in the outlet stator vane arrangement with a consequential reduction in the low cycle fatigue life of the outlet stator vane arrangement. The outlet stator vane arrangement is a relatively expensive component of a gas turbine engine and is expensive to replace.

Accordingly the present disclosure seeks to provide a turbine arrangement including an outlet stator vane arrangement which reduces or overcomes the above mentioned problem.

SUMMARY

The present disclosure provides a turbine arrangement, and a gas turbine engine, as set out in the appended claims.

According to a first aspect there is provided a turbine arrangement including a turbine rotor arrangement, a turbine seal arrangement and a turbine outlet stator vane arrangement;

the turbine rotor arrangement comprising a rotor and a plurality of circumferentially spaced turbine rotor blades extending radially from and being secured to the rotor, each turbine rotor blade having a turbine shroud at a radially outer end;

the turbine seal arrangement being spaced radially from and arranged around the turbine shrouds of the turbine rotor blades;

the turbine outlet stator vane arrangement comprising a radially inner annular member, a radially outer annular member being arranged coaxially around the radially inner annular member, a plurality of circumferentially spaced vanes extending radially between and being secured to the radially inner annular member and the radially outer annular member, the radially outer annular member having a radially inner surface;

the vanes of the turbine outlet stator vane arrangement being arranged downstream of the rotor blades of the turbine rotor arrangement;

a liner being spaced radially inwardly from the radially inner surface of the radially outer annular member to define a chamber having an inlet at an upstream end and an outlet at a downstream end, the turbine shrouds and the upstream end of the liner being arranged relative to each other such that in operation any leakage flow of gas between the turbine shrouds and the turbine seal arrangement flows into the chamber between the radially inner surface of the radially outer annular member and the liner to manage the temperature of the radially outer annular member.

Managing the temperature of the radially outer annular member may mean heating the radially outer annular member. Alternatively it may mean reducing the temperature of the radially outer annular member. In this way the turbine arrangement of the present disclosure provides a thermal management functionality.

The radially inner surface of the turbine shrouds may be arranged at a first radius, the turbine seal arrangement being arranged at a second radius, the upstream end of the liner having a radially outer surface, the radially outer surface at the upstream end of the liner being arranged at a third radius wherein the third radius is equal to or greater than the first radius and less than the second radius.

The radially outer annular member may have a plurality of radially inwardly extending hooks and the liner having a plurality of radially outwardly extending hooks to engage the radially inwardly extending hooks on the radially outer annular member.

The radially outer annular member may have a first annular radially inwardly extending hook and a second annular radially inwardly extending hook spaced axially from the first annular radially inwardly extending hook.

The liner may have a first plurality of circumferentially spaced radially outwardly extending hooks and a second plurality of circumferentially spaced radially outwardly extending hooks spaced axially from the first plurality of circumferentially spaced radially outwardly extending hooks.

The liner may comprise a plurality of circumferentially arranged liner panels. Each liner panel may have circumferentially spaced edges, the circumferentially spaced edges are shaped to correspond to the shape of the vanes. Each liner panel may have at least one radially outwardly extending hook at an upstream end and at least one radially outwardly extending hook at a downstream end. Each liner panel may have two circumferentially spaced radially outwardly extending hooks at an upstream end and two circumferentially spaced radially outwardly extending hooks at the downstream end.

The radially inner surface of the radially outer annular member may have at least one heat transfer augmentation feature extending radially inwardly therefrom. The at least one heat transfer augmentation feature may be arranged between the first annular radially inwardly extending hook and the second annular radially inwardly extending hook. The radially inner surface of the radially outer annular member may have at least one circumferentially extending rib extending radially inwardly therefrom. The radially inner surface of the radially outer annular member may have a plurality of axially spaced circumferentially extending ribs extending radially inwardly therefrom. There may be one or more annular ribs. The, or each, annular rib may be positioned upstream of the leading edges of the vanes or downstream of the trailing edges of the vanes. The radially inner surface of the radially outer annular member may have a plurality of pedestals extending radially inwardly therefrom.

The pedestals may be arranged in a plurality of axially spaced rows. The pedestals may be circular, triangular, square, rectangular or other suitable shape in cross-section.

The radially outer surface of the liner may have at least one heat transfer augmentation feature extending radially outwardly therefrom. The at least one heat transfer augmentation feature may be arranged between the first plurality of circumferentially spaced radially outwardly extending hooks and the second plurality of circumferentially spaced radially outwardly extending hooks. The radially outer surface of the liner may have at least one circumferentially extending rib extending radially outwardly therefrom. The radially outer surface of the liner may have a plurality of axially spaced circumferentially extending ribs extending radially outwardly therefrom. The radially outer surface of the liner may have a plurality of pedestals extending radially outwardly therefrom. The pedestals may be arranged in a plurality of axially spaced rows. The pedestals may be circular, triangular, square, rectangular or other suitable shape in cross-section.

The ribs on the radially inner surface of the radially outer annular member may be arranged axially alternately with the ribs on the radially outer surface of the liner. The rows of pedestals on the radially inner surface of the radially outer annular member may be arranged axially alternately with the rows of pedestals on the radially outer surface of the liner. The pedestals in the rows of pedestals on the radially inner surface of the radially outer annular member may be staggered circumferentially with respect to the pedestals in the rows of pedestals on the liner.

The ribs on the radially inner surface of the radially outer annular member may be arranged axially alternately with rows of pedestals on the outer surface of the liner. The rows of pedestals on the radially inner surface of the radially outer annular member may be arranged axially alternately with ribs on the radially outer surface of the liner. The pedestals may be circular, triangular, square, rectangular or other suitable shape in cross-section.

The upstream end of the liner may curve radially outwardly such that the radially inner surface of the liner and the radially outer surface of the liner curve radially outwardly in an upstream direction.

The downstream end of the liner may curve radially inwardly such that the radially inner surface of the liner and the radially outer surface of the liner curve radially inwardly in a downstream direction.

The radially outer annular member may have at least one radially outwardly extending flange or at least one radially outwardly extending lug whereby in operation the at least one flange or the at least one lug is secured to an aircraft pylon.

The radially outer annular member may have a first radially outwardly extending flange and a second radially outwardly extending flange spaced axially from the first radially outwardly extending flange, whereby in operation the flanges are secured to the aircraft pylon.

The radially outer annular member may have a first radially outwardly extending lug and a second radially outwardly extending lug spaced axially from the first radially outwardly extending lug, whereby in operation the lugs are secured to the aircraft pylon.

A support structure may extend radially inwardly from the radially inner annular member and the support structure supporting a bearing, the bearing rotatably mounting the rotor of the turbine rotor arrangement.

The radially inner annular member may have a radially outer surface, a second liner being spaced radially outwardly from the radially outer surface of the radially inner annular member to define a chamber having an inlet at an upstream end and an outlet at a downstream end.

The radially inner annular member may have a plurality of radially outwardly extending hooks and the second liner having a plurality of radially inwardly extending hooks to engage the radially outwardly extending hooks on the radially inner annular member.

The radially inner annular member may have a first annular radially outwardly extending hook and a second annular radially outwardly extending hook spaced axially from the first annular radially outwardly extending hook.

The second liner may have a first plurality of circumferentially spaced radially inwardly extending hooks and a second plurality of circumferentially spaced radially inwardly extending hooks spaced axially from the first plurality of circumferentially spaced radially inwardly extending hooks.

The second liner may comprise a plurality of circumferentially arranged liner panels. Each liner panel may have circumferentially spaced edges, the circumferentially spaced edges are shaped to correspond to the shape of the vanes. Each liner panel may have at least one radially inwardly extending hook at an upstream end and at least one radially inwardly extending hook at a downstream end. Each liner panel may have two circumferentially spaced radially inwardly extending hooks at an upstream end and two circumferentially spaced radially inwardly extending hooks at the downstream end.

The radially outer surface of the radially inner annular member may have at least one heat transfer augmentation feature extending radially outwardly therefrom. The at least one heat transfer augmentation feature may be arranged between the first annular radially outwardly extending hook and the second annular radially outwardly extending hook. The radially outer surface of the radially inner annular member may have at least one circumferentially extending rib extending radially outwardly therefrom. The radially outer surface of the radially inner annular member may have a plurality of axially spaced circumferentially extending ribs extending radially outwardly therefrom. There may be one or more annular ribs. The, or each, annular rib may be positioned upstream of the leading edges of the vanes or downstream of the trailing edges of the vanes. The radially outer surface of the radially inner annular member may have a plurality of pedestals extending radially outwardly therefrom. The pedestals may be arranged in a plurality of axially spaced rows. The pedestals may be circular, triangular, square, rectangular or other suitable shape in cross-section.

The radially inner surface of the second liner may have at least one heat transfer augmentation feature extending radially inwardly therefrom. The at least one heat transfer augmentation feature may be arranged between the first plurality of circumferentially spaced radially inwardly extending hooks and the second plurality of circumferentially spaced radially inwardly extending hooks. The radially inner surface of the second liner may have at least one circumferentially extending rib extending radially inwardly therefrom. The radially inner surface of the second liner may have a plurality of axially spaced circumferentially extending ribs extending radially inwardly therefrom. The radially inner surface of the second liner may have a plurality of pedestals extending radially inwardly therefrom. The pedestals may be arranged in a plurality of axially spaced rows. The pedestals may be circular, triangular, square, rectangular or other suitable shape in cross-section.

The ribs on the radially outer surface of the radially inner annular member may be arranged axially alternately with the ribs on the radially inner surface of the second liner. The rows of pedestals on the radially outer surface of the radially inner annular member may be arranged axially alternately with the rows of pedestals on the radially inner surface of the second liner. The pedestals in the rows of pedestals on the radially outer surface of the radially inner annular member may be staggered circumferentially with respect to the pedestals in the rows of pedestals on the second liner. The ribs on the radially outer surface of the radially inner annular member may be arranged axially alternately with rows of pedestals on the radially inner surface of the second liner. The rows of pedestals on the radially outer surface of the radially inner annular member may be arranged axially alternately with ribs on the radially inner surface of the second liner. The pedestals may be circular, triangular, square, rectangular or other suitable shape in cross-section.

Each turbine rotor blade may comprise an aerofoil and a platform at a radially inner end of the aerofoil, each turbine blade having at least one internal coolant passage, the at least one internal coolant passage of each turbine rotor blade having an exit radially inward of the platform, the turbine rotor blades and the upstream end of the liner being arranged relative to each other such that in operation any coolant exiting the at least one coolant passages of each turbine rotor blade flows into the chamber between the radially outer surface of the radially inner annular member and the second liner.

The platforms of the turbine rotor blades and the upstream end of the second liner may be arranged relative to each other such that in operation any coolant exiting the at least one coolant passage of each turbine rotor blade flows into the chamber between the radially outer surface of the radially inner annular member and the second liner.

Any coolant exiting the at least one coolant passages of each turbine rotor blade may flow into the chamber between the radially outer surface of the radially inner annular member and the liner to manage the temperature of the radially inner annular member.

Each turbine rotor blade may comprise an aerofoil, a platform at a radially inner end of the aerofoil and a shank underneath the platform, the platforms of at least some of the turbine rotor blades have apertures there-through, a plurality of spaces defined between the shanks of circumferentially adjacent turbine rotor blades, the platforms of circumferentially adjacent turbine rotor blades and the rotor, the turbine rotor blades and the upstream end of the second liner being arranged relative to each other such that in operation any gases in the spaces flows into the chamber between the radially outer surface of the radially inner annular member and the second liner.

The platforms of the turbine rotor blades and the upstream end of the second liner may be arranged relative to each other such that in operation any gases in the spaces flows into the chamber between the radially outer surface of the radially inner annular member and the second liner.

Any gases flowing into the spaces may flow into the chamber between the radially outer surface of the radially inner annular member and the second liner to manage the temperature of the radially inner annular member.

A disc cavity may be arranged between a downstream face of the rotor and an upstream face of a support structure, the support structure being connected to the radially inner annular member, the disc cavity being arranged to supply coolant radially outwardly and in a downstream direction into the chamber between the radially outer surface of the radially inner annular member and the second liner.

Any coolant supplied from the disc cavity may cool the radially inner annular member.

A radially outer surface at the downstream ends of the platforms of the turbine rotor blades being arranged at a fifth radius, the second liner has a radially inner surface and the radially inner surface at the upstream end of the second liner being arranged at a sixth radius, wherein the sixth radius is equal to or less than the fifth radius.

According to a second aspect there is provided a turbine arrangement including a turbine rotor arrangement, a turbine seal arrangement and a turbine outlet stator vane arrangement;

the turbine rotor arrangement comprising a rotor and a plurality of circumferentially spaced turbine rotor blades extending radially from and being secured to the rotor, each turbine rotor blade having a turbine shroud at a radially outer end, the turbine shrouds having a radially inner surface, the radially inner surface of the turbine shrouds being arranged at a first radius;

the turbine seal arrangement being spaced radially from and arranged around the turbine shrouds, the turbine seal arrangement being arranged at a second radius;

the turbine outlet stator vane arrangement comprising a radially inner annular member, a radially outer annular member being arranged coaxially around the radially inner annular member, a plurality of circumferentially spaced vanes extending radially between and being secured to the radially inner annular member and the radially outer annular member, the radially outer annular member having a radially inner surface;

the vanes of the turbine outlet stator vane arrangement being arranged downstream of the rotor blades of the turbine rotor arrangement;

a liner being spaced radially inwardly from the radially inner surface of the radially outer annular member to define a chamber having an inlet at an upstream end and an outlet at a downstream end, the upstream end of the liner having a radially outer surface, the radially outer surface at the upstream end of the liner being arranged at a third radius wherein the third radius is equal to or greater than the first radius and less than the second radius.

According to a third aspect there is provided a turbine rotor arrangement and a turbine outlet stator vane arrangement;

the turbine rotor arrangement comprising a rotor and a plurality of circumferentially spaced turbine rotor blades extending radially from and being secured to the rotor, each turbine rotor blade comprising an aerofoil and a platform at a radially inner end of the aerofoil;

the turbine outlet stator vane arrangement comprising a radially inner annular member, a radially outer annular member being arranged coaxially around the radially inner annular member, a plurality of circumferentially spaced vanes extending radially between and being secured to the radially inner annular member and the radially outer annular member, the radially inner annular member having a radially outer surface;

the vanes of the turbine outlet stator vane arrangement being arranged downstream of the rotor blades of the turbine rotor arrangement;

a liner being spaced radially outwardly from the radially outer surface of the radially inner annular member to define a chamber having an inlet at an upstream end and an outlet at a downstream end such that in operation a fluid flows into the chamber between the radially outer surface of the radially inner annular member and the liner to control the temperature of the radially inner annular member.

According to a fourth aspect there is provided a gas turbine engine comprising a turbine arrangement according to the first aspect, the second aspect or the third aspect.

According to a fifth aspect there is provided a gas turbine engine for an aircraft, the gas turbine engine comprising:

an engine core comprising a turbine, a compressor, and a core shaft connecting the turbine to the compressor;

a fan located upstream of the engine core, the fan comprising a plurality of fan blades; and a gearbox that receives an input from the core shaft and outputs drive to the fan so as to drive the fan at a lower rotational speed than the core shaft, the turbine including a turbine rotor arrangement, a turbine seal arrangement and a turbine outlet stator vane arrangement;

the turbine rotor arrangement comprising a rotor and a plurality of circumferentially spaced turbine rotor blades extending radially from and being secured to the rotor, each turbine rotor blade having a turbine shroud at a radially outer end;

the turbine seal arrangement being spaced radially from and arranged around the turbine shrouds of the turbine rotor blades;

the turbine outlet stator vane arrangement comprising a radially inner annular member, a radially outer annular member being arranged coaxially around the radially inner annular member, a plurality of circumferentially spaced vanes extending radially between and being secured to the radially inner annular member and the radially outer annular member, the radially outer annular member having a radially inner surface;

the vanes of the turbine outlet stator vane arrangement being arranged downstream of the rotor blades of the turbine rotor arrangement;

a liner being spaced radially inwardly from the radially inner surface of the radially outer annular member to define a chamber having an inlet at an upstream end and an outlet at a downstream end, the turbine shrouds and the upstream end of the liner being arranged relative to each other such that in operation any leakage flow of gas between the turbine shrouds and the turbine seal arrangement flows into the chamber between the radially inner surface of the radially outer annular member and the liner to manage the temperature of the radially outer annular member.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

Figure 1:
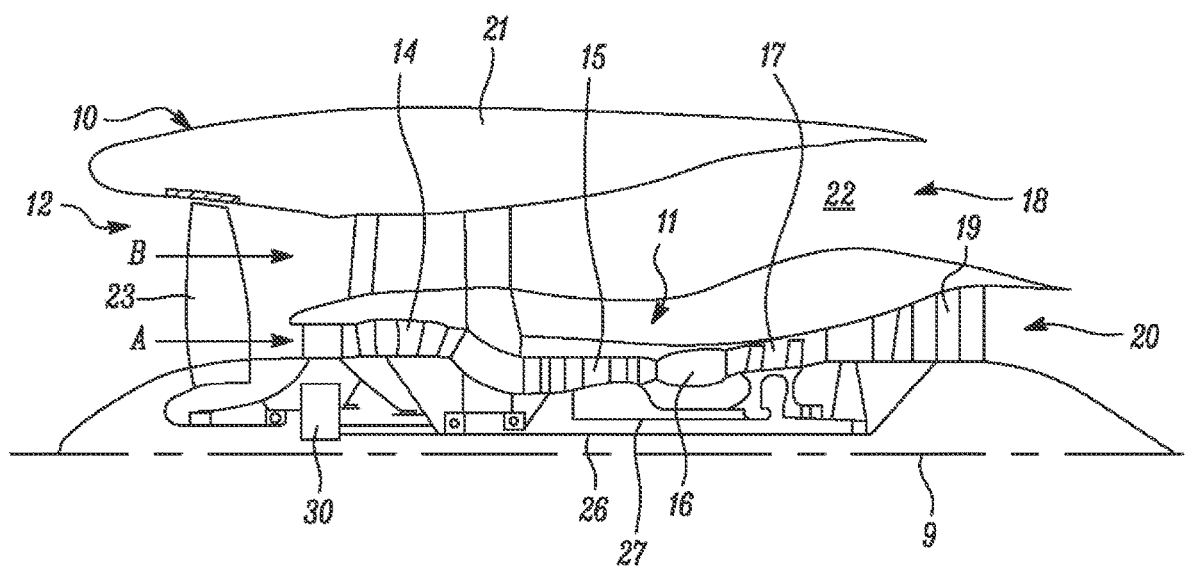
FIG. 1 is a sectional side view of a gas turbine engine.
Figure 2:
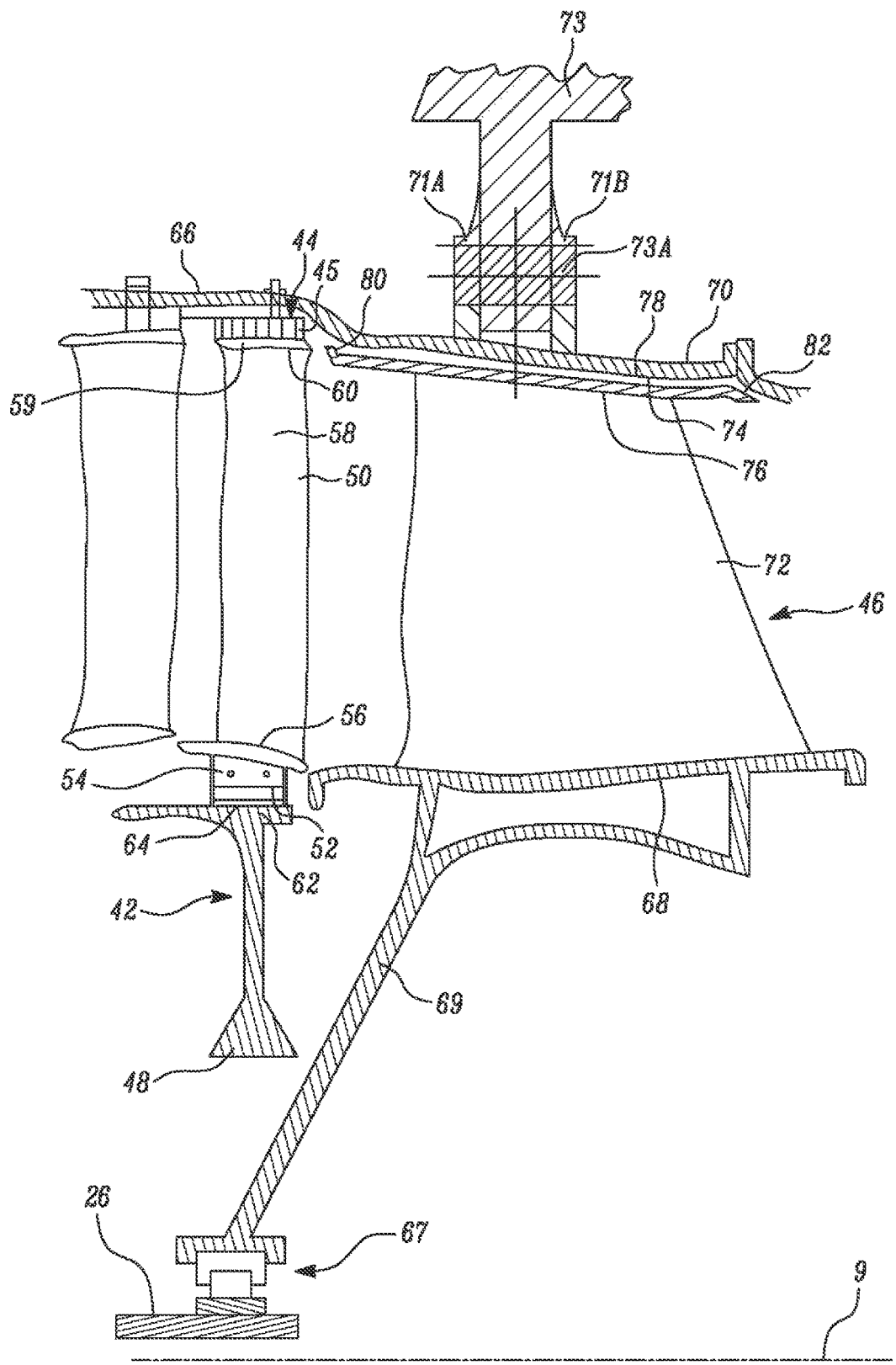
FIG. 2 is an enlarged cross-sectional view of the low pressure turbine shown in FIG. 1.

The following table lists the reference numerals used in the drawings with the features to which they refer:

| Ref. | Description | FIG. |
|---|---|---|
| 9 | Principal rotational axis (of engine) | 1 2 9 12 13 14 |
| 10 | Gas turbine engine | 1 |
| 11 | Engine core | 1 |
| 12 | Air intake | 1 |
| 14 | Low pressure compressor | 1 |
| 15 | High pressure compressor | 1 |
| 16 | Combustion equipment | 1 |
| 17 | High pressure turbine | 1 |
| 18 | Bypass exhaust nozzle | 1 |
| 19 | Low pressure turbine | 1 |
| 20 | Core exhaust nozzle | 1 |
| 21 | Nacelle | 1 |
| 22 | Bypass duct | 1 |
| 23 | Fan | 1 |
| 26 | Shaft | 1 9 12 13 14 |
| 27 | Shaft | 1 |
| 30 | Epicyclic gearbox | 1 |
| 42 | Turbine rotor arrangement | 2 9 12 13 14 |
| 44 | Turbine seal arrangement | 2 3 9 12 13 14 |
| 45 | Honeycomb structure | 2 9 12 13 14 |
| 46 | Turbine outlet stator vane arrangement | 2 3 9 12 13 14 |
| 47 | Solid backing member | 3 |
| 48 | Rotor | 2 9 12 13 14 |
| 50 | Turbine rotor blade | 3 9 12 13 14 |
| 52 | Root | 2 9 12 13 14 |

-continued

Figure 4:
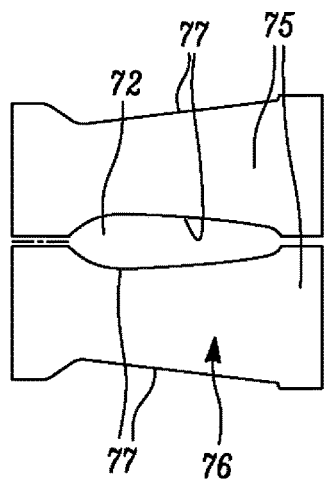
FIG. 4 is a view in the direction of arrow C in FIG. 3.
Figure 5:
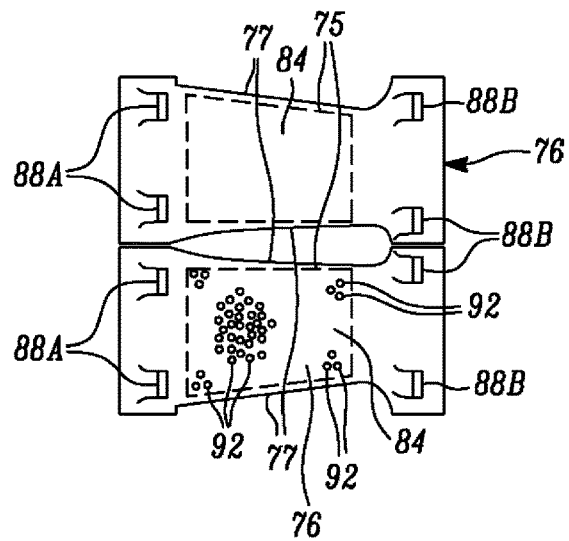
FIG. 5 is a view in the direction of arrow D in FIG. 3 with the radially outer annular member removed.
Figure 7:
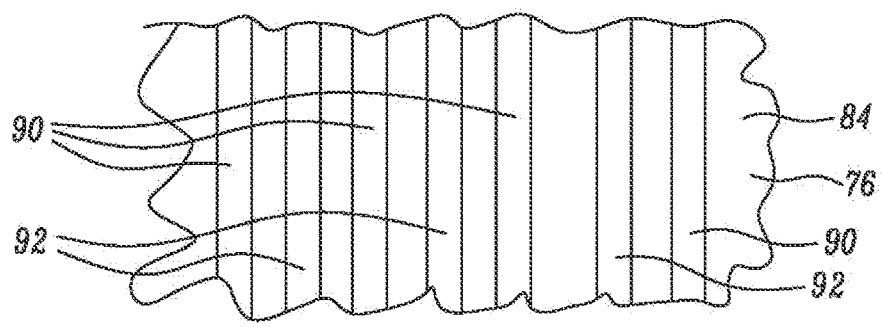
FIG. 7 is a view in the direction of arrow E in FIG. 6 with the radially outer annular member removed.
Figure 10:
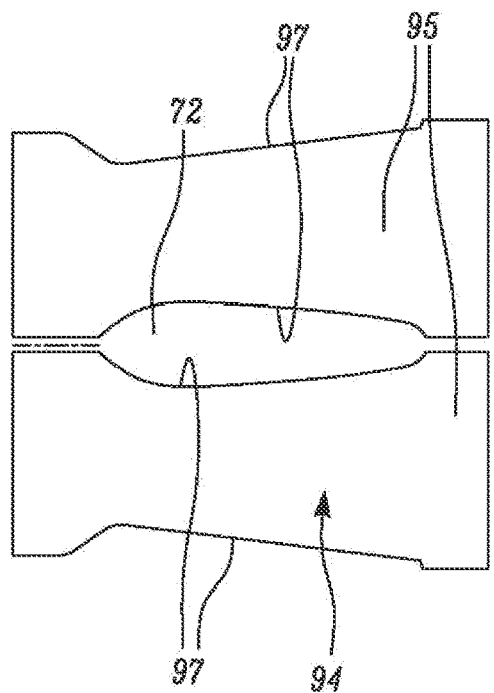
FIG. 10 is a view in the direction of arrow J in FIG. 9.
Figure 11:
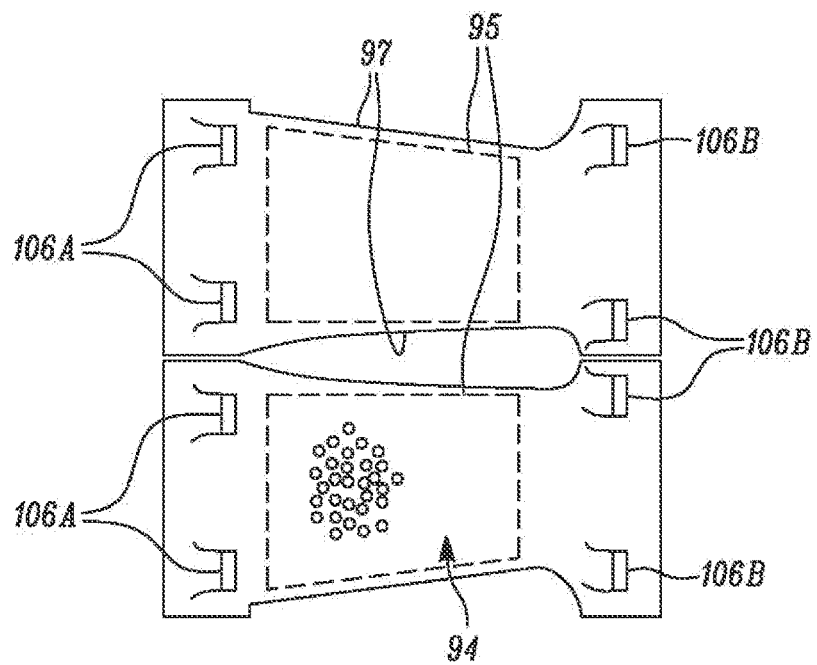
FIG. 11 is a view in the direction of arrow K in FIG. 9 with the radially inner annular member removed.

| Ref. | Description | FIG. |
|---|---|---|
| 54 | Shank | 2 9 12 13 14 |
| 56 | Platform | 2 9 12 13 14 |
| 58 | Aerofoil | 2 3 9 12 13 14 |
| 59 | Radially inner surface | 2 3 9 12 13 14 |
| 60 | Turbine shroud | 2 3 9 12 13 14 |
| 61 | Fin | 2 3 |
| 62 | Rim | 2 9 12 13 14 |
| 64 | Slot | 2 9 12 13 14 |
| 66 | Turbine casing | 2 9 12 13 14 |
| 67 | Bearing | 2 9 12 13 14 |
| 68 | Radially inner annular member | 2 9 12 13 14 |
| 69 | Support structure | 2 9 12 13 14 |
| 70 | Radially outer annular member | 2 6 9 12 13 14 15 |
| 71 | Lug | 3 |
| 71A | First radially outwardly extending flange | 2 9 12 13 14 |
| 71B | Second radially outwardly extending flange | 2 9 12 13 14 |
| 72 | Vane | 2 3 4 5 9 10 12 13 14 |
| 73 | Aircraft pylon | 2 9 12 13 14 |
| 73A | Pin | 2 9 12 13 14 |
| 74 | Radially inner surface | 2 3 6 9 12 13 14 |
| 75 | Liner panel | 4 5 |
| 76 | Liner | 2 3 4 5 6 7 8 9 12 13 14 |
| 77 | Edge (of liner panel) | 4 5 |
| 78 | Chamber | 2 3 6 9 12 13 14 |
| 80 | Inlet | 2 3 9 12 13 14 |
| 82 | Outlet | 2 3 9 12 13 14 |
| 84 | Radially outer surface | 3 5 6 7 8 |
| 86A | First annular radially inwardly extending hook | 3 5 |
| 86B | Second annular radially inwardly extending hook | 3 5 |
| 88A | Radially outwardly extending hook | 3 5 |
| 88B | Radially outwardly extending hook | 3 5 |
| 90 | Heat transfer augmentation feature | 3 6 7 8 |
| 92 | Heat transfer augmentation feature e.g. ribs and/or pedestals | 5 6 7 8 |
| 93 | Radially inner surface | 9 12 13 14 |
| 94 | Second liner | 9 12 13 14 |
| 95 | Liner panel | 10 11 |
| 96 | Radially outer surface (of radially inner annular member 68) | 9 12 13 14 |
| 97 | Edge (of liner panel) | 10 11 |
| 98 | Second chamber | 9 12 13 14 |
| 100 | Inlet (to second chamber 98) | 9 12 13 14 |
| 102 | Outlet (at a downstream end of the second liner 94) | 9 12 13 14 |
| 104 | Radially outwardly extending hook | 9 12 13 14 |
| 106 | Radially inwardly extending hook | 9 |
| 106A | Radially inwardly extending hook | 11 |
| 106B | Radially inwardly extending hook | 11 |
| 108 | Aperture (in liner 76) | 12 13 14 15 |
| 110 | Aperture (in second liner 94) | 12 13 14 |
| 112 | Disc cavity | 9 12 13 14 |
| 114 | Apertures | 9 12 13 14 |
| 116 | Spaces | 9 |
| 200 | Stator vane arrangement | 14 |
| A | Core air flow | 1 |
| B | Bypass airflow | 1 |
| C | Arrow of direction giving view shown in FIG. 4 | 3 |
| D | Arrow of direction giving view shown in FIG. 5 | 3 |
| E | Arrow of direction giving view shown in FIG. 7/8 | 6 |
| G | Flow of hot exhaust gases | 3 |
| H | Flow of hot exhaust gases | 3 |
| I | Flow of hot exhaust gases | 3 |
| J | Arrow of direction giving view shown in FIG. 10 | 9 12 13 14 |
| K | Arrow of direction giving view shown in FIG. 11 | 9 12 13 14 |
| R1 | First radius | 3 |
| R2 | Second radius | 3 |
| R3 | Third radius | 3 |
| R4 | Fourth radius | 3 |
| R5 | Fifth radius | 9 12 13 14 |
| R6 | Sixth radius | 9 12 13 14 |

DETAILED DESCRIPTION

Aspects and embodiments of the present disclosure will now be discussed with reference to the accompanying figures. Further aspects and embodiments will be apparent to those skilled in the art.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

The low pressure turbine 17 includes a turbine rotor arrangement 42, a turbine seal arrangement 44 and a turbine outlet stator vane arrangement 46, as shown in FIGS. 2 to 5.

The turbine rotor arrangement 42 comprises a rotor 48 and a plurality of circumferentially spaced turbine rotor blades 50 extending radially from and being secured to the rotor 48. Each turbine rotor blade 50 comprises a root 52, a shank, 54, a platform 56, an aerofoil 58 and a turbine shroud 60. The root 52 of each turbine rotor blade 50 locates in a slot 64 in the rim 62 of the rotor 48. The rotor 48 comprises one or more axially spaced discs secured together by fasteners or may comprise a unitary drum. In the case that the rotor 48 comprises a plurality of discs, each of the discs has a plurality of circumferentially spaced turbine rotor blades 50 extending radially from and being secured to the respective disc.

The turbine seal arrangement 44 is spaced radially from and arranged around the turbine shrouds 60 of the turbine rotor blades 50. The turbine seal arrangement 44 is mounted onto a turbine casing 66.

The turbine outlet stator vane arrangement 46 comprises a radially inner annular member 68, a radially outer annular member 70 arranged coaxially around the radially inner annular member 68 and a plurality of circumferentially spaced vanes 72 extending radially between and secured to the radially inner annular member 68 and the radially outer annular member 70.

While the radially outer annular member 70 is arranged coaxially around the radially inner annular member 68, the coaxial arrangement may include some eccentricity and retain its functionality.

The radially outer annular member 70 has a radially inner surface 74. The vanes 72 of the turbine outlet stator vane arrangement 46 are arranged downstream of the rotor blades 50 of the turbine rotor arrangement 42 and in particular are arranged downstream of the most downstream row of rotor blades 50 of the turbine rotor arrangement 42.

The radially outer annular member 70 has at least one radially outwardly extending flange, or at least one radially outwardly extending lug 71, whereby in operation the at least one flange, or the at least one lug 71 is secured to an aircraft pylon 73 by at least one pin 73a. The radially outer annular member 70 may have a first radially outwardly extending flange 71A and a second radially outwardly extending flange 71B spaced axially from the first radially outwardly extending flange 71A, whereby in operation the flanges 71A and 71B are secured to the aircraft pylon 73. The flanges 71A and 71B may be connected to the aircraft pylon 73 at two circumferentially spaced points. Alternatively, the radially outer annular member 70 may have a first radially outwardly extending lug 71A and a second radially outwardly extending lug 71B spaced axially from the first radially outwardly extending lug 71A, whereby in operation the lugs 71A and 71B are secured to the aircraft pylon 73. Alternatively, the radially outer annular member 70 may have a first radially outwardly extending lug 71A and a second radially outwardly extending lug 71B spaced axially from the first radially outwardly extending lug 71A, a third radially outwardly extending lug (not shown) arranged in the same plane perpendicular to the rotational axis 9 as the first radially outwardly extending lug 71A but spaced circumferentially from the first radially outwardly extending lug 71A and a fourth radially outwardly extending lug (not shown) arranged in the same plane perpendicular to the rotational axis 9 as the second radially outwardly extending lug 71B but spaced circumferentially from the second radially outwardly extending lug 71B, whereby in operation each of the first, second, third and fourth lugs are secured to the aircraft pylon 73.

A support structure 69 extends radially inwardly from the radially inner annular member 68 and the support structure 69 supports a bearing 67. The rotor 48 is connected to the shaft 26. The bearing 67 rotatably mounts the rotor 48 of the turbine rotor arrangement 42 and in particular the bearing 67 rotatably mounts a downstream end of the shaft 26. As mentioned above the shaft 26 connects the low pressure turbine 17 to the intermediate pressure compressor 14 and connects the low pressure turbine 17 to the sun gear 28 of the epicyclic gearbox 30. The bearing 67 may be a roller bearing or a ball bearing.

A liner 76 is spaced radially inwardly from the radially inner surface 74 of the radially outer annular member 70 to define a chamber 78 which has an inlet 80 at an upstream end of the liner 76 and an outlet 82 at a downstream end of the liner 76. The turbine shrouds 60 and the upstream end of the liner 76 are arranged relative to each other such that in operation any leakage flow of gas between the turbine shrouds 60 and the turbine seal arrangement 44 flows into the chamber 78 between the radially inner surface 74 of the radially outer annular member 70 and the liner 76 to manage the temperature of the radially outer annular member 70. The turbine shrouds 60 have radially outwardly extending fins 61 which form a seal with the turbine seal arrangement 44. The turbine seal arrangement 44 for example comprises a honeycomb structure 45, bonded to a solid backing member 47 and the fins 61 of the turbine shrouds 60 are arranged to rub against the honeycomb structure 45 or form a small clearance with the honeycomb structure 45. Alternatively, the turbine seal arrangement 44 comprises an abradable material 45 bonded to a solid backing member 47 and the fins 61 of the turbine shrouds 60 are arranged to rub against the abradable material 45 or form a small clearance with the abradable material 45. There may be a plurality of axially spaced fins 61 to form a labyrinth seal with the honeycomb structure 45, or the abradable material 45, of the turbine seal arrangement 44.

Figure 3:
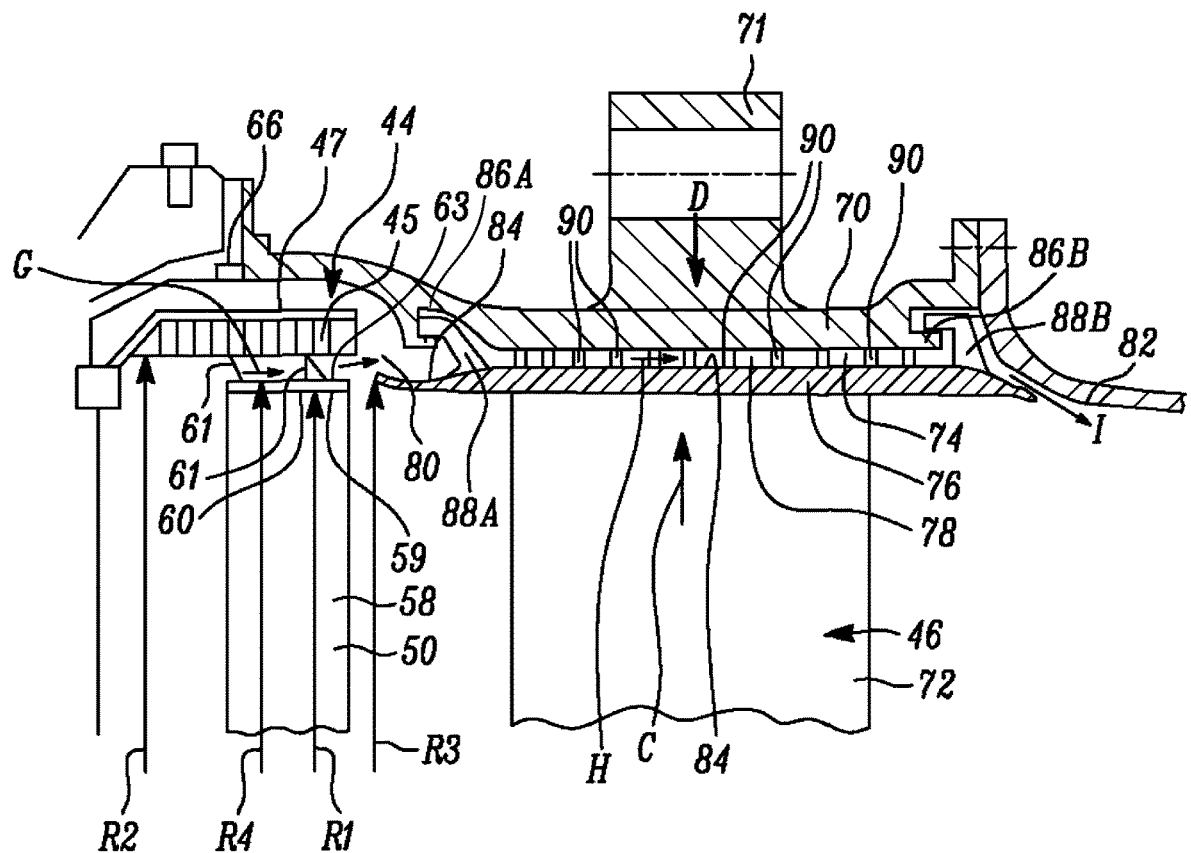
FIG. 3 is a further enlarged cross-sectional view of part of the low pressure turbine shown in FIG. 2.

A radially inner surface 59 at the downstream ends of the turbine shrouds 60 is arranged at a first radius R1, the turbine seal arrangement 44 is arranged at a second radius R2, the liner 76 has a radially outer surface 84 and the radially outer surface 84 at the upstream end of the liner 76 is arranged at a third radius R3 wherein the third radius R3 is equal to or greater than the first radius R1 and less than the second radius R2, as shown in FIG. 3. A radially outer surface 63 at the downstream ends of the turbine shrouds 60 is arranged at a fourth radius R4. The third radius R3 may be equal to or greater than the fourth radius R4. The radii R1, R2, R3 and R4 are measured relative to the rotational axis 9.

The radially outer annular member 70 has a plurality of radially inwardly extending hooks 86 and the liner 76 has a plurality of radially outwardly extending hooks 88 to engage the radially inwardly extending hooks 86 on the radially outer annular member 70. The radially outer annular member 70 has a first annular radially inwardly extending hook 86A and a second annular radially inwardly extending hook 86B spaced axially from the first annular radially inwardly extending hook 86A. The liner 76 has a first plurality of circumferentially spaced radially outwardly extending hooks 88A and a second plurality of circumferentially spaced radially outwardly extending hooks 88B spaced axially from the first plurality of circumferentially spaced radially outwardly extending hooks 88A. The liner 76 comprises a plurality of circumferentially arranged liner panels 75. Each liner panel 75 has circumferentially spaced edges 77 and the circumferentially spaced edges 77 are shaped to correspond to the shape of the vanes 72. Each liner panel 75 has at least one radially outwardly extending hook 88A at an upstream end and at least one radially outwardly extending hook 88B at a downstream end. Each liner panel 75 may have two circumferentially spaced radially outwardly extending hooks 88A at an upstream end and two circumferentially spaced radially outwardly extending hooks 88B at the downstream end.

If desired, the radially outer annular member 70 may engage with the liner 76 in a manner that does not involve the use of hooks i.e. they may be engageable using an alternative arrangement, for example using flanges and bolted joints and the like.

The upstream end of the liner 76 curves radially outwardly such that the radially inner surface of the liner 76 and the radially outer surface of the liner 76 curve radially outwardly in an upstream direction.

The downstream end of the liner 76 curves radially inwardly such that the radially inner surface of the liner 76 and the radially outer surface of the liner 76 curve radially inwardly in a downstream direction. This curvature of the downstream end of the liner 76 enables the flow of hot exhaust gases exiting the chamber 78 to return to the flowpath through the gas turbine engine 10 downstream of the vanes 72 in an aerodynamically efficient manner.

In operation the over tip leakage flow of hot exhaust gases G between the turbine shrouds 60 and the turbine seal arrangement 44 flows into the chamber 78 between the radially inner surface 74 of the radially outer annular member 70 and the liner 76 to manage the temperature of the radially outer annular member 70. The hot exhaust gases H flowing between the turbine shrouds 60 and the turbine seal arrangement 44 is hotter than the mean exit temperature of the hot exhaust gases that have passed between and over the surfaces of the aerofoils 58 of the last stage of turbine blades 50 as the flow of hot exhaust gases in the over tip leakage flow do not have any work extracted from it. This means that these hot exhaust gases H have greater thermal potential for heating the radially outer annular member 70 and these hot exhaust gases are ducted in close proximity to the radially inner surface 74 of the radially outer annular member 70. The liner 76 defines a duct to direct these hot exhaust gases H into close proximity to the radially inner surface 74 of the radially outer annular member 70. In addition the hot exhaust gases I leaving the chamber 78 are directed in a controlled way into the flowpath through the gas turbine engine 10 downstream of the vanes 72 of the turbine outlet stator vane arrangement 46 and reduce pressure losses in the flow between the vanes 72 of the turbine outlet stator vane arrangement 46 and hence reduce specific fuel consumption of the gas turbine engine 10. In prior art arrangements the hot exhaust gases in the over tip leakage flow normally mix back into the a flowpath through the gas turbine engine in an uncontrolled way upstream of the vanes of the turbine outlet stator vane arrangement, produce an increase in pressure loss in the flow between the vanes of the turbine outlet guide vanes and hence increase specific fuel consumption. The heat provided by the hot exhaust gases flowing through the chamber 78 heats the radially outer annular member 70 and causes the radially outer annular member 70 to expand radially outwardly and/or increases the rate at which the radially outer annular member 70 expands radially outwardly and hence reduces the stresses on the turbine outlet stator vane arrangement 46 with a consequential increase in the low cycle fatigue life of the turbine outlet stator vane arrangement 46.

The radially inner surface 74 of the radially outer annular member 70 has at least one heat transfer augmentation feature 90 extending radially inwardly therefrom, as shown in FIG. 3. The at least one heat transfer augmentation feature 90 is arranged axially between the first annular radially inwardly extending hook 86A and the second annular radially inwardly extending hook 86B. The radially inner surface 74 of the radially outer annular member 70 may have at least one circumferentially extending rib extending radially inwardly therefrom. The radially inner surface 74 of the radially outer annular member 70 may have a plurality of axially spaced circumferentially extending ribs extending radially inwardly therefrom. One or more of the ribs may an annular rib. The, or each, annular rib is positioned upstream of the leading edges of the vanes 72 or downstream of the trailing edges of the vanes 72. The ribs axially between the leading edges of the vanes and the trailing edges of the vanes 72 extend circumferentially between two adjacent vanes 72. The radially inner surface 74 of the radially outer annular member 70 may have a plurality of pedestals extending radially inwardly therefrom. The pedestals may be arranged in a plurality of axially spaced rows. The rib, the ribs and/or the pedestals form the heat transfer augmentation features. The radially outer surface 84 of the liner panels 75 do not have any heat transfer augmentation features as shown in the uppermost liner panel 75 in FIG. 5. The augmentation features, e.g. the ribs and/or pedestals, 90 shown in FIG. 3 increase the transfer of heat into the radially outer annular member 70, e.g. increase the rate at which the radially outer annular member 70 heats up.

The radially outer surface 84 of the liner panels 75 of the liner 76 may have at least one heat transfer augmentation feature 92 extending radially outwardly therefrom, as shown in the lowermost liner panel 75 in FIG. 5. The at least one heat transfer augmentation feature 92 is arranged between the first plurality of circumferentially spaced radially outwardly extending hooks 88A and the second plurality of circumferentially spaced radially outwardly extending hooks 88B. The radially outer surface 84 of the liner panels 75 of the liner 76 may have at least one circumferentially extending rib extending radially outwardly therefrom. The radially outer surface 84 of the liner panels 75 of the liner 76 may have a plurality of axially spaced circumferentially extending ribs extending radially outwardly therefrom. One or more of the ribs may be an annular rib and in particular the circumferentially extending ribs on the circumferentially adjacent liner panels 75 are aligned to form an annular rib. The, or each, annular rib is positioned upstream of the leading edges of the vanes 72 or downstream of the trailing edges of the vanes 72. The ribs axially between the leading edges of the vanes and the trailing edges of the vanes 72 extend circumferentially between two adjacent vanes 72. The radially outer surface 84 of the liner panels 75 of the liner 76 may have a plurality of pedestals extending radially outwardly therefrom. The pedestals may be arranged in a plurality of axially spaced rows. The augmentation features, e.g. the ribs and/or pedestals, 92 shown in FIG. 3 increase the transfer of heat into the radially outer annular member 70, e.g. increase the rate at which the radially outer annular member 70 heats up.

Figure 6:
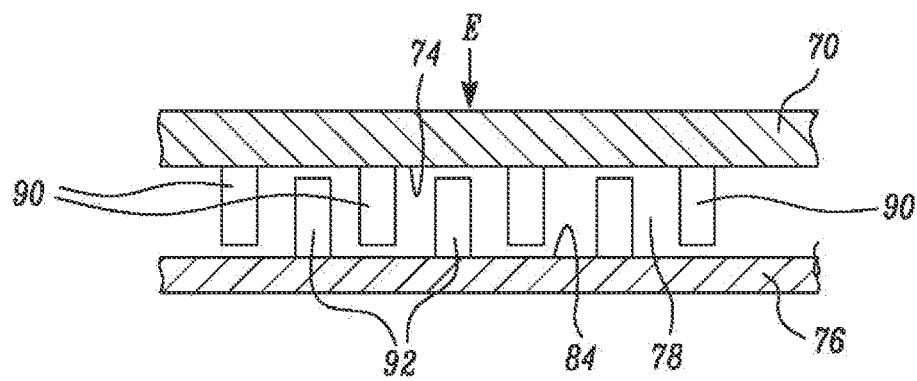
FIG. 6 is a further enlarged alternative cross-sectional view of part of the low pressure turbine shown in FIG. 2.

FIG. 6 shows an arrangement in which the radially inner surface 74 of the radially outer annular member 70 has at least one heat transfer augmentation feature 90 extending radially inwardly therefrom and the radially outer surface 84 of the liner panels 75 of the liner 76 may have at least one heat transfer augmentation feature 92 extending radially outwardly therefrom.

FIG. 7 shows an arrangement in which ribs on the radially inner surface 74 of the radially outer annular member 70 are arranged axially alternately with ribs on the radially outer surface 84 of the liner panels 75 of the liner 76.

Figure 8:
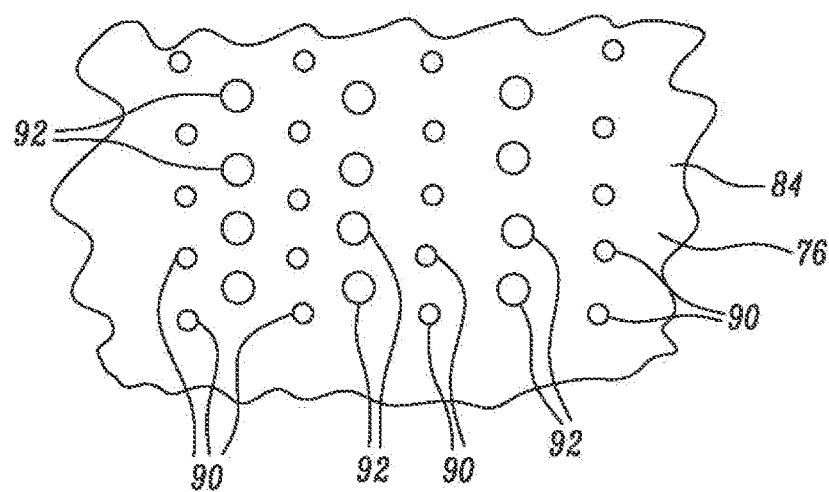
FIG. 8 is an alternative view in the direction of arrow E in FIG. 6 with the radially outer annular member removed.

FIG. 8 shows an arrangement in which rows of pedestals on the radially inner surface 74 of the radially outer annular member 70 are arranged axially alternately with rows of pedestals on the radially outer surface 84 of the liner panels 75 of the liner 76. The pedestals in the rows of pedestals on the radially inner surface 74 of the radially outer annular member 70 are staggered circumferentially with respect to the pedestals in the rows of pedestals on the liner panels 75 of the liner 76. The augmentation features, e.g. the ribs and/or pedestals, 92 shown in FIG. 3 increase the transfer of heat into the radially outer annular member 70, e.g. increase the rate at which the radially outer annular member 70 heats up.

In another arrangement, not shown, ribs on the radially inner surface of the radially outer annular member may be arranged axially alternately with rows of pedestals on the outer surface of the liner. In a further arrangement, not shown, rows of pedestals on the radially inner surface of the radially outer annular member may be arranged axially alternately with ribs on the radially outer surface of the liner. The augmentation features increase the transfer of heat into the radially outer annular member, e.g. increase the rate at which the radially outer annular member 70 heats up.

The chamber defined between the liner and the radially outer annular member allows the flow of relatively hot exhaust gases flowing through the gap between the turbine shrouds and the turbine seal arrangement to manage the temperature of the radially outer annular member and the augmentation features maximise heat transfer into the radially outer member such that the radially outer annular member more closely matches the expansion of the vanes and hence reduces stress levels. The liner may also contribute to turbine blade containment which enables the thickness of the radially outer annular member to be reduced and hence reduce the mass and the stiffness of the radially outer annular member and enable the radially outer annular member to heat up more rapidly and therefore reduce thermal fatigue stress.

Figure 9:
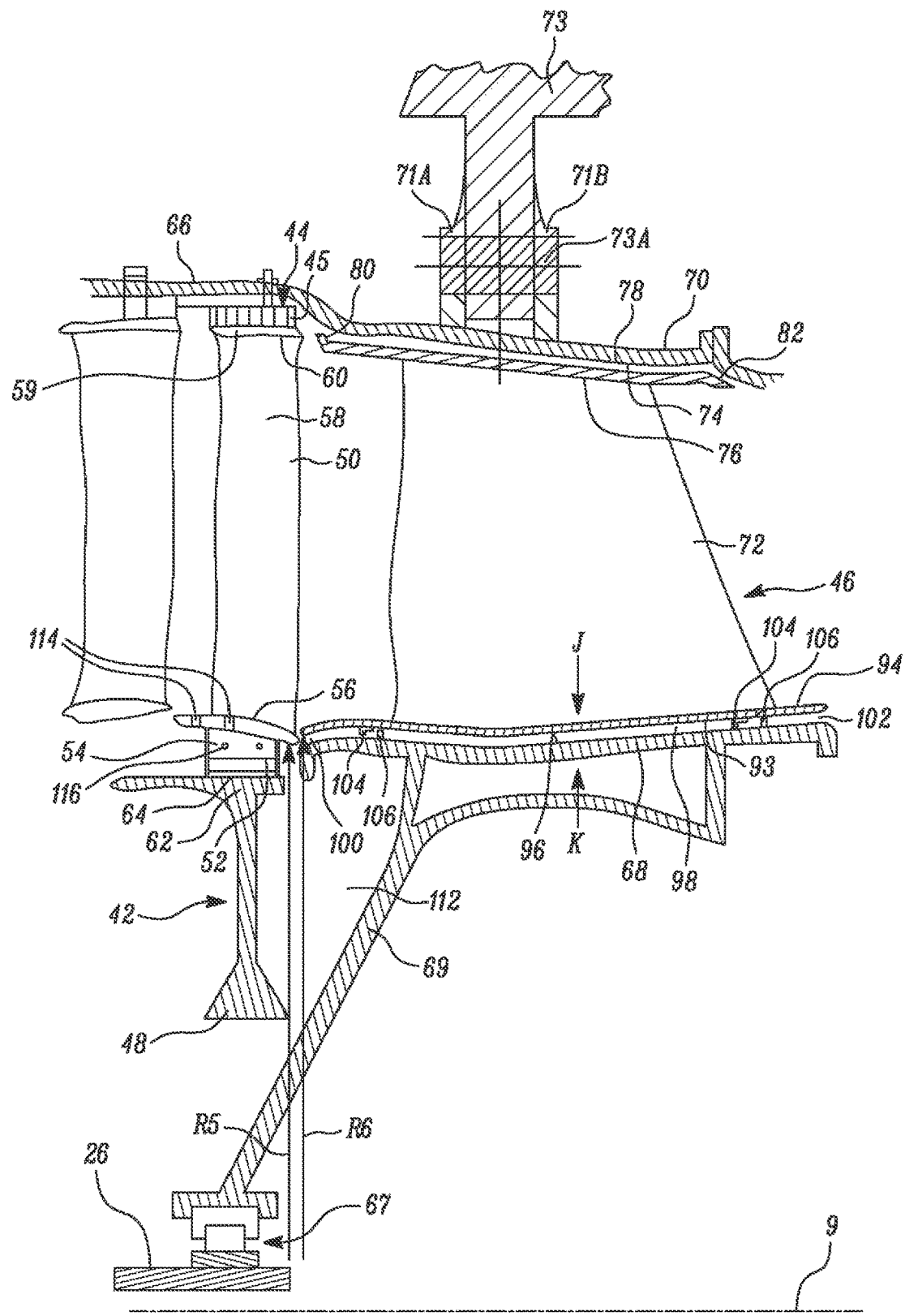
FIG. 9 is an alternative enlarged cross-sectional view of the low pressure turbine shown in FIG. 1.

An alternative arrangement of the low pressure turbine 17 is shown in FIGS. 9 to 11 and also includes a turbine rotor arrangement 42, a turbine seal arrangement 44 and a turbine outlet stator vane arrangement 46. The arrangement of FIGS. 9 to 11 is substantially the same as that shown in FIGS. 2 to 5, and like parts are denoted by like numbers. FIGS. 9 to 11 differ from the arrangement of FIGS. 2 to 5 in that a second liner 94 is spaced radially outwardly from the radially outer surface 96 of the radially inner annular member 68 to define a second chamber 98 which has an inlet 100 at an upstream end of the liner 94 and an outlet 102 at a downstream end of the second liner 94.

The turbine rotor blades 50 and the upstream end of the second liner 94 are arranged relative to each other such that in operation coolant which has flowed through internal coolant passages within the turbine rotor blades 50 flows into the second chamber 98 between the radially outer surface 74 of the radially inner annular member 68 and the second liner 94. The coolant may heat the radially inner annular member 68 if it is hotter than the radially inner annular member 68 or cool the radially inner annular member 68 if it is hotter than the radially inner annular member 68. The turbine rotor blades 50 are provided with coolant passage exits arranged radially below the platforms 56 of the turbine rotor blades 50 and at the downstream ends of the turbine rotor blades 50 coolant which has flowed through internal coolant passages within the turbine rotor blades 50 flows into the second chamber 98 between the radially outer surface 74 of the radially inner annular member 68 and the second liner 94 to heat, or cool, the radially inner annular member 68. A radially outer surface 57 at the downstream ends of the platforms 56 of the turbine rotor blades 50 is arranged at a fifth radius R5, the second liner 94 has a radially inner surface 93 and the radially inner surface 93 at the upstream end of the second liner 94 is arranged at a sixth radius R6, wherein the sixth radius R6 is equal to or less than the fifth radius R5. A radially inner surface 55 at the downstream ends of the platforms 56 of the turbine rotor blades 50 is arranged at a seventh radius R7 and the sixth radius R6 is equal to or less than the seventh radius R7. The radii R5, R6 and R7 are measured relative to the rotational axis 9.

The radially inner annular member 68 has a plurality of radially outwardly extending hooks 104 and the second liner 94 has a plurality of radially inwardly extending hooks 106 to engage the radially inwardly extending hooks 104 on the radially inner annular member 68. The radially inner annular member 68 has a first annular radially outwardly extending hook 104 and a second annular radially outwardly extending hook 104 spaced axially from the first annular radially inwardly extending hook 104. The second liner 94 has a first plurality of circumferentially spaced radially inwardly extending hooks 106A and a second plurality of circumferentially spaced radially inwardly extending hooks 106B spaced axially from the first plurality of circumferentially spaced radially inwardly extending hooks 106A. The second liner 94 comprises a plurality of circumferentially arranged liner panels 95. Each liner panel 95 has circumferentially spaced edges 97 and the circumferentially spaced edges 97 are shaped to correspond to the shape of the vanes 72. Each liner panel 95 has at least one radially inwardly extending hook 106A at an upstream end and at least one radially inwardly extending hook 106B at a downstream end. Each liner panel 95 may have two circumferentially spaced radially inwardly extending hooks 106A at an upstream end and two circumferentially spaced radially inwardly extending hooks 106B at the downstream end.

The radially inner annular member 68 and/or the second liner 94 may have heat transfer augmentation features as described with reference to those used on the radially outer annular member 70 and/or the liner 76, e.g. circumferentially extending ribs or rows of pedestals or circumferentially extending ribs and rows of pedestals.

Alternatively, cooling air is supplied from a disc cavity 112 between a downstream face of the rotor 48 and an upstream face of the support structure 69 radially outwardly and then in a downstream direction into the second chamber 98 to cool the radially inner annular member 68. A further alternative is to provide apertures 114 in the platforms 56 of the turbine rotor blades 50 to connect the hot exhaust gases in the flow path through the turbine rotor blades 50 with spaces 116 radially underneath the platforms 56, radially above the disc posts of the rotor 48 and circumferentially between the shanks 54 of the turbine rotor blades 50 such that hot exhaust gas is able to flow radially inwardly into the spaces 116 and then in a downstream direction into the second chamber 98 to manage the temperature of the radially inner annular member 68.

Figure 12:
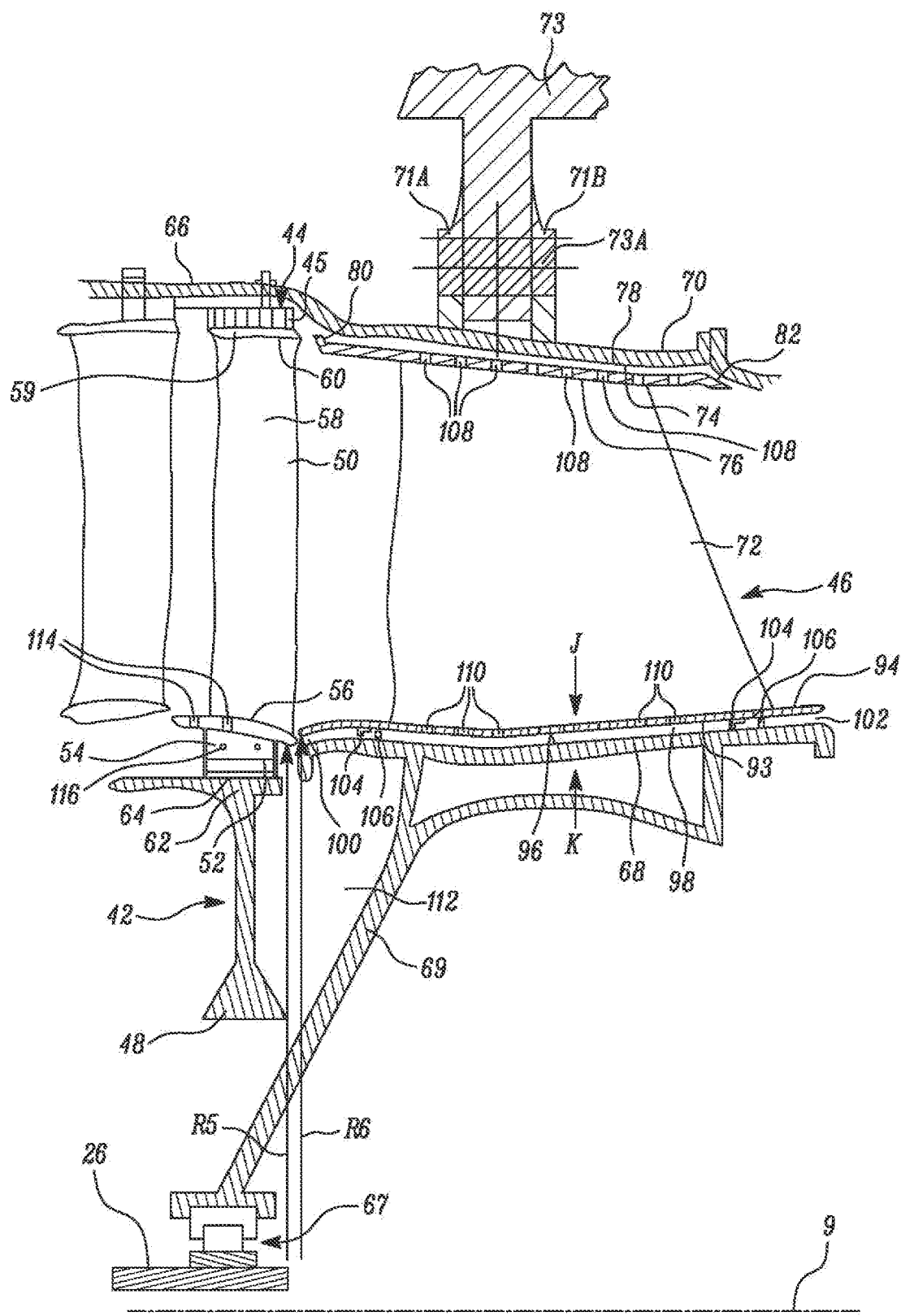
FIG. 12 is an alternative enlarged cross-sectional view of the low pressure turbine shown in FIG. 1.

An alternative arrangement of the low pressure turbine 17 is shown in FIG. 12 and also includes a turbine rotor arrangement 42, a turbine seal arrangement 44 and a turbine outlet stator vane arrangement 46. The arrangement of FIG. 12 is substantially the same as that shown in FIGS. 9 to 11, and like parts are denoted by like numbers. The arrangement in FIG. 12 differs in that the liner 76 and the second liner 94 are provided with apertures 108 and 110 respectively. The apertures 108 extend radially through the liner 76 and interconnect the chamber 78 and the gas in the flow path through the turbine outlet stator vane arrangement 46. Similarly the apertures 110 extend radially through the second liner 94 and interconnect the second chamber 98 and the gas in the flow path through the turbine outlet stator vane arrangement 46. The apertures 108 in the liner 76 and the apertures 110 in the second liner 94 allow gases to flow from the flow path through the turbine outlet stator vane arrangement 46 into the chamber 78 and the second chamber 98 respectively. The gas flowing through the apertures 108 into the chamber 78 reduces the heating effect of the over tip leakage flow of hot exhaust gases G between the turbine shrouds 60 and the turbine seal arrangement 44. The gas flowing through the apertures 110 into the second chamber 98 may reduce the heating effect of the cooling air flowing out of the turbine rotor blades 50, reduce the cooling effect of the cooling air flowing from the disc cavity 112 or reduce the heating effect of the hot gas which has flowed through the apertures 114 and the spaces 116.

In FIGS. 5 to 11 and FIG. 12 a fluid is supplied into the second chamber 98 to control the temperature of the radially inner annular member 68.

Figure 13:
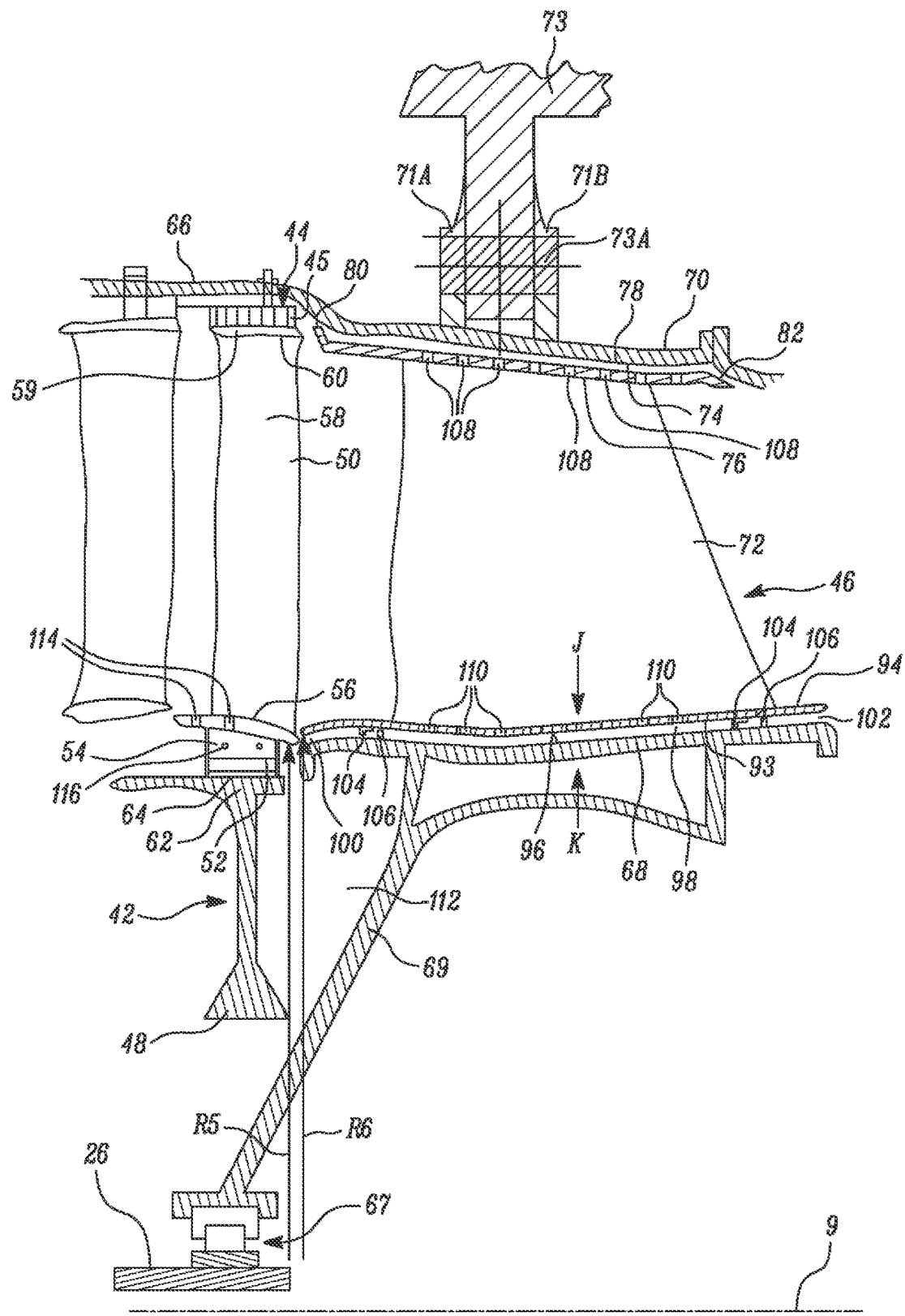
FIG. 13 is an enlarged cross-sectional view of an alternative embodiment of the low pressure turbine shown in FIG. 1 that has a narrower inlet to the chamber that is defined by the liner and the radially inner surface of the radially outer annular member.

FIG. 13 shows an alternative arrangement of the low pressure turbine 17 shown in FIG. 12 but only alternative in that there is a narrower inlet to the chamber that is defined by the liner and the radially inner surface of the radially outer annular member, i.e. the inlet is partially sealed.

Figure 14:
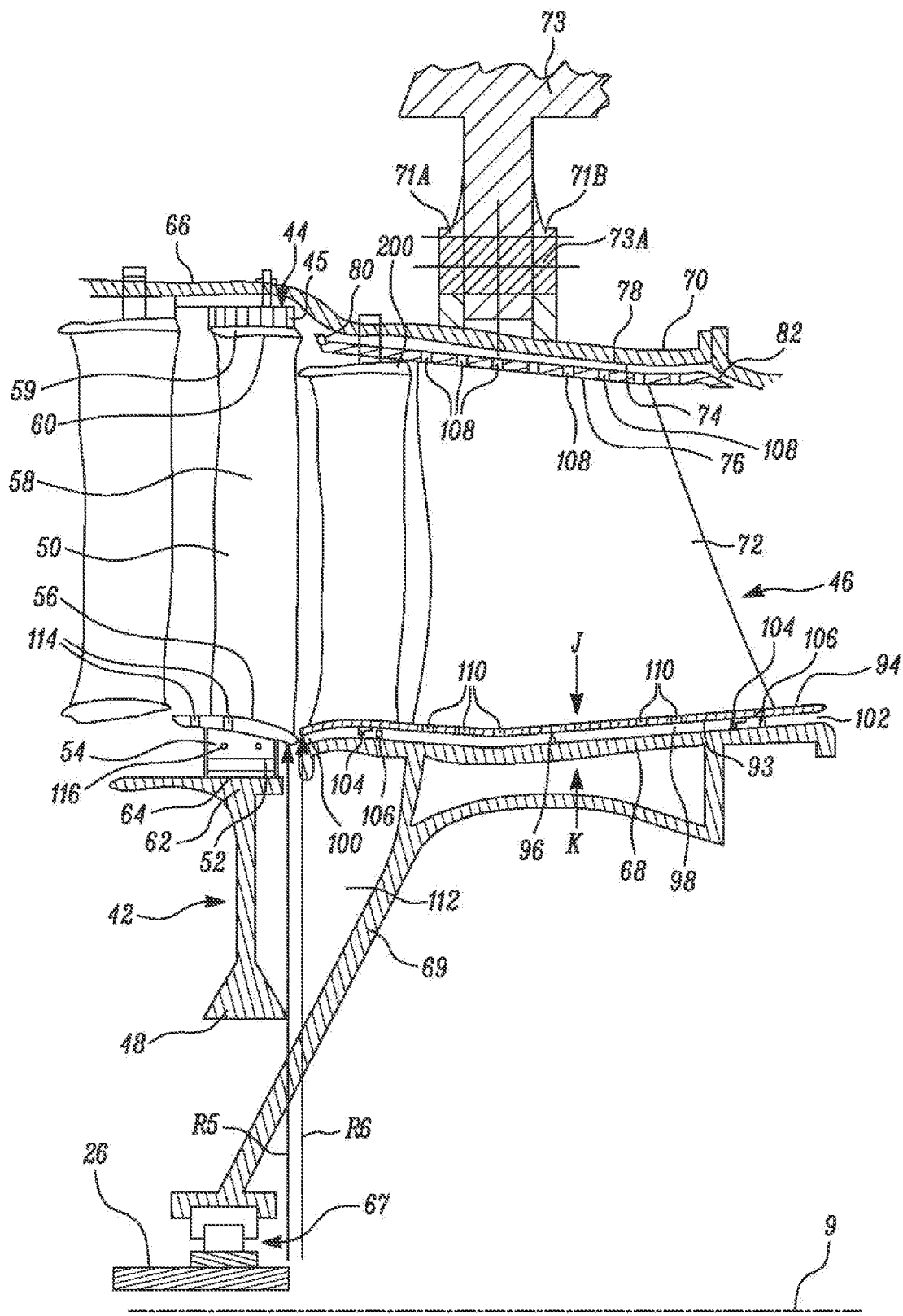
FIG. 14 is an enlarged cross-sectional view of another embodiment of the low pressure turbine shown in FIG. 1 where a stator vane arrangement is located between the turbine rotor arrangement and the turbine outlet stator vane arrangement. The stator vane arrangement is one of a static row of aerofoils.

FIG. 14 shows an alternative low pressure configuration where a static row of aerofoils 200 is positioned between the last blade and the turbine outlet static vane.

Figure 15:
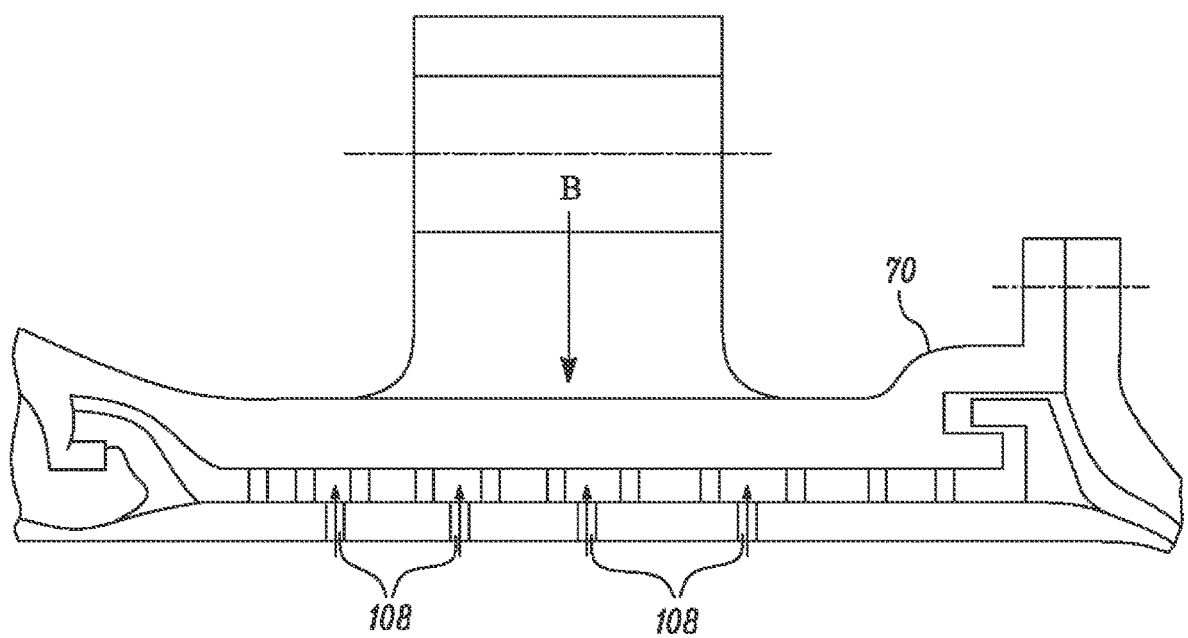
FIG. 15 is enlarged cross-sectional view of an alternative radially outer annular member arrangement and a liner. It includes apertures to enhance heat transfer by impingement.

FIG. 15 shows an alternative liner configuration, featuring apertures 108 that enable the gas path flow heating the radially outer annular member 70 in a more efficient way by means of impingement, i.e. by having small apertures 108 fast moving jets of air will form that augment heat extraction by increasing the heat transfer coefficient.

Although the present disclosure has referred to the use of radially inwardly extending hooks on the radially outer annular member and radially outwardly extending hooks on the liner to mount the liner on the radially outer annular member, it is equally possible to use other mountings. For example, bolted radial nuts and bolts (fasteners) and/or radial flanges with bolts and nuts (fasteners) could be used.

Although the present disclosure has referred to the radially outer annular member being secured to an aircraft pylon, or other aircraft structure, it is equally possible that the radially outer annular member is not secured to an aircraft pylon or aircraft structure.

Although the present disclosure has referred to a support structure extending radially inwardly from the radially inner annular member to support a bearing, it is equally possible that a support structure is not provided extending radially inwardly from the radially inner annular member. Further one could use a support structure that extends inwards but does not support a bearing.

The turbine arrangement of the present disclosure has been described above for use in a gas turbine engine however the technology is applicable to other engines including direct drive turbines and it may be employed in industrial or marine settings.

It will be understood that the invention is not limited to the embodiments above-described and various modifications and improvements can be made without departing from the concepts described herein.

The invention claimed is:

1. A turbine arrangement including a turbine rotor arrangement, a turbine seal arrangement and a turbine outlet stator vane arrangement;
   the turbine rotor arrangement comprising a rotor and a plurality of circumferentially spaced turbine rotor blades extending radially from and being secured to the rotor, each turbine rotor blade having a turbine shroud at a radially outer end;
   the turbine seal arrangement being spaced radially from and arranged around the turbine shrouds of the turbine rotor blades;
   the turbine outlet stator vane arrangement comprising a radially inner annular member, a radially outer annular member being arranged coaxially around the radially inner annular member, a plurality of circumferentially spaced vanes extending radially between and being secured to the radially inner annular member and the radially outer annular member, the radially outer annular member having a radially inner surface;
   the vanes of the turbine outlet stator vane arrangement being arranged downstream of the rotor blades of the turbine rotor arrangement;
   a liner being spaced radially inwardly from the radially inner surface of the radially outer annular member to define a chamber having an inlet at an upstream end of the liner and an outlet at a downstream end, each of the turbine shrouds and the upstream end of the liner being arranged relative to each other such that in operation any leakage flow of gas between the turbine shrouds and the turbine seal arrangement flows into the chamber between the radially inner surface of the radially outer annular member and the liner to manage the temperature of the radially outer annular member; and
   wherein the radially inner surface of the radially outer annular member having at least one heat transfer augmentation feature extending radially inwardly therefrom.

2. The turbine arrangement of claim 1, wherein a radially inner surface of the turbine shrouds being arranged at a first radius, the turbine seal arrangement being arranged at a second radius, the upstream end of the liner having a radially outer surface, the radially outer surface at the upstream end of the liner being arranged at a third radius wherein the third radius is equal to or greater than the first radius and less than the second radius.

3. The turbine arrangement of claim 1, wherein the radially outer annular member having a plurality of radially inwardly extending hooks and the liner having a plurality of radially outwardly extending hooks to engage the radially inwardly extending hooks on the radially outer annular member.

4. The turbine arrangement of claim 3, wherein the plurality of radially inwardly extending hooks includes a first annular radially inwardly extending hook and a second annular radially inwardly extending hook spaced axially from the first annular radially inwardly extending hook.

5. The turbine arrangement of claim 3, wherein the plurality of radially outwardly extending hooks includes a first plurality of circumferentially spaced radially outwardly extending hooks and a second plurality of circumferentially spaced radially outwardly extending hooks spaced axially from the first plurality of circumferentially spaced radially outwardly extending hooks.

6. The turbine arrangement of claim 1, wherein the liner comprises a plurality of circumferentially arranged liner panels.

7. The turbine arrangement of claim 6, wherein each liner panel having circumferentially spaced edges, the circumferentially spaced edges are shaped to correspond to a shape of the vanes.

8. The turbine arrangement of claim 1, wherein the radially inner surface of the radially outer annular member having at least one circumferentially extending rib extending radially inwardly therefrom as the at least one heat transfer augmentation feature.

9. The turbine arrangement of claim 1, wherein the radially inner surface of the radially outer annular member having a plurality of pedestals extending radially inwardly therefrom as the at least one heat transfer augmentation feature.

10. The turbine arrangement of claim 1, wherein a radially outer surface of the liner having at least one second heat transfer augmentation feature extending radially outwardly therefrom.

11. The turbine arrangement of claim 10, wherein the radially outer surface of the liner having at least one circumferentially extending rib extending radially outwardly therefrom as the at least one second heat transfer augmentation feature.

12. The turbine arrangement of claim 10, wherein the radially outer surface of the liner having a plurality of pedestals extending radially outwardly therefrom as the at least one second heat transfer augmentation feature.

13. The turbine arrangement of claim 1, wherein each turbine rotor blade comprising an aerofoil and a platform at a radially inner end of the aerofoil, each turbine blade having at least one internal coolant passage, the at least one internal coolant passage of each turbine rotor blade having an exit radially inward of the platform, the turbine rotor blades and an upstream end of a second liner being arranged relative to each other such that in operation any coolant exiting the at least one coolant passage of each turbine rotor blade flows into a chamber between a radially outer surface of the radially inner annular member and the second liner.

14. The turbine arrangement of claim 13, wherein a radially inner surface at downstream ends of the platforms of the turbine rotor blades being arranged at a fifth radius, the second liner has a radially inner surface and the radially inner surface at the upstream end of the second liner being arranged at a sixth radius, wherein the sixth radius is equal to or greater than the fifth radius.

15. The turbine arrangement of claim 13, wherein the radially inner annular member having a plurality of radially outwardly extending hooks and the second liner having a plurality of radially inwardly extending hooks to engage the radially outwardly extending hooks on the radially inner annular member.

16. The turbine arrangement of claim 13, wherein the radially outer surface of the radially inner annular member having at least one heat transfer augmentation feature extending radially outwardly therefrom or a radially inner surface of the second liner having at least one heat transfer augmentation feature extending radially inwardly therefrom.

17. The turbine arrangement of claim 1, wherein each turbine rotor blade comprising an aerofoil, a platform at a radially inner end of the aerofoil and a shank underneath the platform, the platforms of at least some of the turbine rotor blades have apertures there-through, a plurality of spaces defined between the shanks of circumferentially adjacent turbine rotor blades, and between the platforms of circumferentially adjacent turbine rotor blades and the rotor, the turbine rotor blades and an upstream end of a second liner being arranged relative to each other such that in operation gases in the spaces flows into a chamber between a radially outer surface of the radially inner annular member and the second liner.

18. The turbine arrangement of claim 1, wherein a disc cavity is arranged between a downstream face of the rotor and an upstream face of a support structure, the support structure being connected to the radially inner annular member, the disc cavity being arranged to supply coolant radially outwardly and in a downstream direction into a chamber between a radially outer surface of the radially inner annular member and a second liner.

19. A gas turbine engine comprising the turbine arrangement according to claim 1.

* * * * *